March 10, 1931. V. VALLETTA 1,796,067
VARIABLE SPEED GEARING, PARTICULARLY FOR MOTOR VEHICLES
Filed Nov. 19, 1929
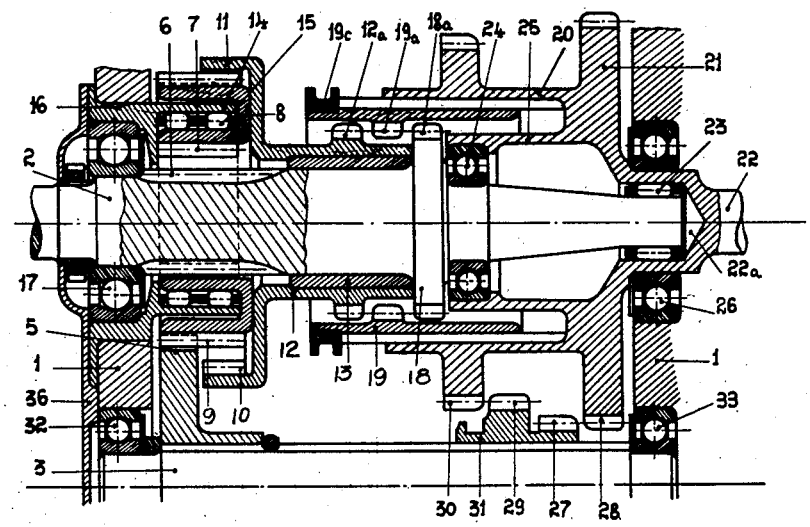

Patented Mar. 10, 1931

1,796,067

UNITED STATES PATENT OFFICE

VITTORIO VALLETTA, OF TURIN, ITALY, ASSIGNOR TO FIAT SOCIETÁ ANONIMA, OF TURIN, ITALY

VARIABLE-SPEED GEARING, PARTICULARLY FOR MOTOR VEHICLES

Application filed November 19, 1929, Serial No. 408,292, and in Italy November 24, 1928.

This invention relates to a variable speed gearing for motor vehicles comprising sets of internally toothed wheels of the type described in the co-pending patent application Ser. No. 351,971 filed April 2, 1929, and its purpose is to simplify the construction from the standpoint of manufacture and assemblage without altering the size of the gear members.

Another object of my invention is to strengthen the annular support for the internally and externally toothed gear in order to improve the rigidity of mesh of said gear.

Other objects and advantages of my invention will be set forth in the following specification in which reference is made to the accompanying drawing showing an axial vertical section through the variable speed gearing of the type specified, wherein the outer set of teeth of the gear carried by the annual support is utilized for transmitting power to the countershaft of the variable speed gearing, so that said support is not cut away as in the construction described in the abovementioned co-pending application.

Referring to the figure, 1 denotes the gear box cast in one piece not including the rear wall through which is fitted the bell-shaped end of the transmission shaft 22 with all the members carried by the bell and described hereinafter.

The engine shaft 2 drives a C-shaped ring 8 eccentric to the engine shaft having both an internal set of teeth 7 meshing with the pinion 6 of the engine shaft and an external set of teeth 9 meshing with the internal set of teeth 10 of the crown 11 eccentric to the ring 8 and carried by the sleeve 12 mounted on the engine shaft 2 by means of a socket 13. The annular eccentric support 14 carries the ring 8 through the medium of rollers 15 placed in the hollow of the C-shaped ring, the support forming part of a member 16 fixed to the front wall of the gearbox 1 which also houses the ball bearing 17 for the engine shaft 2.

The external set of teeth 9 projects from the ring 8 and meshes by said projecting portion with a toothed wheel 5 keyed on the countershaft 3. By this construction the annular support 14—16 can be made short and continuous unlike the construction disclosed in the co-pending application mentioned above, which improves the rigidity of mesh of the pairs of toothed wheels 6:7 and 9:10. Moreover by this fact the speed of rotation of the countershaft 3 is greatly reduced with respect to the engine shaft 2, because the set of teeth 6 may be made of very small diameter with respect to the set of teeth 5.

The transmission shaft carries a disk-shaped part 21 with a double-bell 20:25, of which the inner bell 25 houses the ball bearing 24 for mutually supporting the shafts 2 and 22, the outer bell 20 having the set of teeth 30 for the second speed, while the disk 21 is provided with the teeth 28 for the first speed. The gears 29 and 27, respectively, may be alternatingly thrown into gear with the gears 30 and 28, the gears 29 and 27 being rigidly connected together and mounted capable of axial displacement through the usual collar 31 on the countershaft 3.

The engine shaft 2 has a terminal support on rollers 23 disposed in a recess 22a and carries a crown 18 provided with dog teeth 18a; a set of dog teeth 12a is also carried by the sleeve 12 and with the dog teeth 12a and 18a cooperate the dog teeth 19a carried by a sleeve 19 provided with a collar 19c and fitted in the bell 20 in which it is capable of axial displacement whilst it is kept from rotating.

The transmission shaft 22 is supported in the usual manner by the rear wall of the gearbox 1 with the interposition of a ball bearing 26 and the countershaft 3 is supported by the front and rear walls of the gearbox through roller bearings 32 and 33, respectively.

A cover 36 attached to the front wall of the gearbox protects the front supports of the engine shaft and countershaft.

The operation of the change speed gear is as follows: Assuming the parts in the idle position shown on the drawing, the pinions movable on the countershaft 3 are displaced to the right, causing the pinion 27 to mesh with the toothed crown 28. The first speed is thus obtained. For obtaining the second speed the pinions are displaced to the left, bringing the pinion 29 into gear with the toothed crown 30. The third speed is obtained by bringing the pinions 27—29 into idle position and displacing the sleeve 19 to the right, in order to cause the dog teeth 19a to mesh with the teeth 12a. By displacing the sleeve 19 to the left for causing the teeth 19a to mesh with the teeth 18c the direct drive is obtained.

What I claim is:

1. Variable speed gearing comprising in combination a gearbox, an engine shaft extending into said gearbox, a toothed wheel on said shaft, a sleeve rotatable on the latter, and having internal teeth, a transmission shaft with a bell-shaped end, in which is co-axially supported the engine shaft end by means of a bearing on the bell edge and a bearing on the bell bottom, a casing for supporting the engine shaft mounted in the gearbox and having an annular eccentric extension, a C-shaped ring supported by said annular eccentric extension and having a set of internal teeth meshing with the toothed wheel on the engine shaft and an external set of teeth meshing with an internal set of teeth carried by the sleeve rotatably mounted on the engine shaft, dog teeth on said sleeve and on said engine shaft, a sleeve movable in the bell-shaped end of the transmission shaft and provided with dog teeth that may be alternatingly brought into mesh with the dog teeth of the firstmentioned sleeve and of said engine shaft, two toothed crowns on said bell, a countershaft, means external to said annular eccentric extension for transmitting motion from the engine shaft to the countershaft and pinions slidably mounted but kept against rotation on said countershaft and that may be alternatingly brought into gear with the corresponding toothed crowns on the bell.

2. Variable speed gearing comprising in combination a gearbox, an engine shaft extending into said gearbox, a toothed wheel on said shaft, a sleeve rotatable on the latter, and having internal teeth, a transmission shaft with a bell-shaped end in which is co-axially supported the engine shaft end, a casing for supporting the engine shaft mounted in the gearbox and having an annular eccentric extension, a C-shaped ring supported by said annular eccentric extension and having a set of internal teeth meshing with the toothed wheel on the engine shaft and an external set of teeth meshing with an internal set of teeth carried by the sleeve rotatably mounted on the engine shaft, dog teeth on said sleeve and on said engine shaft, a sleeve movable in the bell-shaped end of the transmission shaft and provided with dog teeth that may be alternatingly brought into mesh with the dog teeth of the firstmentioned sleeve and of said engine shaft, two toothed crowns on said bell, a countershaft, a toothed wheel on said countershaft meshing with the external teeth of said C-shaped ring and pinions mounted for axial displacement but kept against rotation on said countershaft and that may be alternatingly thrown into gear with the corresponding toothed crowns on said bell.

3. Variable speed gearing comprising in combination a gearbox, an engine shaft extending into said gearbox, a toothed wheel on said shaft, a sleeve rotatable on the latter, and having internal teeth, a transmission shaft with a bell-shaped end in which is co-axially supported the engine shaft end by means of a bearing on the bell edge and a bearing on the bell bottom, a casing for supporting the engine shaft mounted in the gearbox and having an annular eccentric extension, a C-shaped ring supported by said annular eccentric extension and having a set of internal teeth meshing with the toothed wheel on the engine shaft and an external set of teeth meshing with an internal set of teeth carried by the sleeve rotatably mounted on the engine shaft, dog teeth on said sleeve and on said engine shaft, a sleeve movable in the bell-shaped end of the transmission shaft and provided with dog teeth that may be alternatingly brought into mesh with the dog teeth of the firstmentioned sleeve and of said engine shaft, two toothed crowns on said bell, a countershaft, a toothed wheel on said countershaft meshing with the external set of teeth of the C-shaped ring and pinions mounted for axial displacement but kept against rotation on said countershaft and that may be alternatingly thrown into gear with the corresponding toothed crowns on said bell.

4. In a variable speed mechanism, a gear box, an engine shaft extending therein, teeth on said shaft, a casing mounted in the gear box for supporting the engine shaft having an annular excentric extension, a C-shaped ring supported by said extension, said ring having internal teeth meshing with the teeth on the engine shaft and external teeth, a sleeve rotatably mounted on the engine shaft and having teeth meshing with the external teeth of the ring, a transmission shaft, mechanism to connect the latter shaft with said sleeve or with the engine shaft, gears carried by the transmission shaft, a counter shaft driven by said ring and shiftable means on the counter-shaft to engage the gears on the transmission shaft and drive the latter at different speeds when said means are in operative position.

In testimony that I claim the foregoing as my invention, I have signed my name.

VITTORIO VALLETTA.